(12) United States Patent
St. Onge et al.

(10) Patent No.: US 8,128,853 B2
(45) Date of Patent: Mar. 6, 2012

(54) FUSION PROCESS FOR CONDUIT

(75) Inventors: Bryan St. Onge, Hastings (CA); Henri St. Onge, Hastings (CA); Thomas Marti, Mars, PA (US)

(73) Assignee: Underground Solutions Technologies Group, Inc., Poway, CA (US)

( * ) Notice: Subject to any disclaimer, the term of this patent is extended or adjusted under 35 U.S.C. 154(b) by 566 days.

(21) Appl. No.: 11/244,123

(22) Filed: Oct. 5, 2005

(65) Prior Publication Data

US 2006/0071365 A1    Apr. 6, 2006

Related U.S. Application Data

(63) Continuation of application No. 10/788,921, filed on Feb. 26, 2004, now Pat. No. 6,982,051.

(60) Provisional application No. 60/478,313, filed on Jun. 13, 2003.

(51) Int. Cl.
*B29C 65/00* (2006.01)
(52) U.S. Cl. ............... 264/248; 156/304.2; 156/503
(58) Field of Classification Search ............. 156/503, 156/304.2; 264/248
See application file for complete search history.

(56) References Cited

U.S. PATENT DOCUMENTS

| | | | |
|---|---|---|---|
| 3,002,871 A | 10/1961 | Tramm et al. | |
| 3,276,941 A | 10/1966 | Burns | |
| 3,359,599 A | 12/1967 | Martin et al. | |
| 3,847,694 A | 11/1974 | Stewing | |
| 3,887,992 A | 6/1975 | Parmann | |
| 3,989,778 A | 11/1976 | Osborne | |
| 4,089,455 A | 5/1978 | Fellers | |
| 4,113,813 A | 9/1978 | Wilson | |
| 4,135,961 A | 1/1979 | Yoshizawa et al. | |
| 4,258,935 A | 3/1981 | Rodrigo et al. | |
| 4,389,877 A | 6/1983 | Lacey | |
| 4,390,384 A | 6/1983 | Turner | |
| 4,507,119 A | 3/1985 | Spencer | |

(Continued)

FOREIGN PATENT DOCUMENTS

DE    3639932 A1    6/1988

(Continued)

OTHER PUBLICATIONS

WaterWorld Editorial Feature, Apr. 2007, Copyright 2007 by PennWell Corporation.*

(Continued)

*Primary Examiner* — Yogendra Gupta
*Assistant Examiner* — Jeremiah Smith
(74) *Attorney, Agent, or Firm* — The Webb Law Firm

(57) ABSTRACT

Disclosed is a method and apparatus for use in a fusion process for conduit. The method includes the steps of: removably positioning a first terminal edge of a first conduit portion with a first terminal edge of a second conduit portion; facing the terminal edges of the first conduit portion and the second conduit portion; aligning the terminal edges of the first conduit portion and the second conduit portion; melting at least a portion of the terminal edges of the first conduit portion and the second conduit portion; engaging the melted terminal edge of the first conduit portion with the melted terminal edge of the second conduit portion; maintaining pressure between the engaged terminal edges, thereby creating a fused joint area; and removing at least a portion of the resultant external bead extending around the fused joint area. A fusion apparatus for employing this method is also disclosed.

11 Claims, 6 Drawing Sheets

U.S. PATENT DOCUMENTS

| | | | |
|---|---|---|---|
| 4,610,670 A | 9/1986 | Spencer | |
| 4,619,642 A | 10/1986 | Spencer | |
| 4,642,155 A | 2/1987 | Ramsey | |
| 4,684,789 A | 8/1987 | Eggleston | |
| 4,695,335 A | 9/1987 | Lyall | |
| 4,780,163 A | 10/1988 | Haneline, Jr. et al. | |
| 4,786,088 A | 11/1988 | Ziu | |
| 4,792,374 A * | 12/1988 | Rianda | 156/503 |
| 4,813,160 A | 3/1989 | Kuznetz | |
| 4,933,036 A | 6/1990 | Shaposka et al. | |
| 4,963,421 A | 10/1990 | Dickinson et al. | |
| 4,987,018 A | 1/1991 | Dickinson et al. | |
| 5,007,767 A * | 4/1991 | Stafford | 405/184.2 |
| 5,013,376 A * | 5/1991 | McElroy et al. | 156/64 |
| 5,124,109 A | 6/1992 | Drossbach | |
| 5,141,580 A | 8/1992 | Dufour et al. | |
| 5,147,697 A | 9/1992 | Ijyuin et al. | |
| 5,241,157 A | 8/1993 | Wermelinger et al. | |
| 5,368,809 A | 11/1994 | Steketee, Jr. | |
| 5,385,173 A | 1/1995 | Gargiulo | |
| 5,399,301 A | 3/1995 | Menendez et al. | |
| 5,407,514 A | 4/1995 | Butts et al. | |
| 5,464,496 A | 11/1995 | Wilson et al. | |
| 5,469,891 A | 11/1995 | Lund et al. | |
| 5,546,992 A | 8/1996 | Chick et al. | |
| 5,554,332 A | 9/1996 | Schnallinger | |
| 5,595,651 A | 1/1997 | Pavel | |
| 5,671,952 A | 9/1997 | Ligh | |
| 5,720,411 A | 2/1998 | Darby et al. | |
| 5,743,299 A | 4/1998 | Chick et al. | |
| 5,778,938 A | 7/1998 | Chick et al. | |
| 5,794,662 A | 8/1998 | St. Onge et al. | |
| 5,802,689 A | 9/1998 | Sano | |
| 5,824,179 A * | 10/1998 | Greig | 156/274.2 |
| 5,921,587 A | 7/1999 | Lueghamer | |
| 5,924,455 A | 7/1999 | Jo et al. | |
| 6,123,110 A | 9/2000 | Smith et al. | |
| 6,156,144 A | 12/2000 | Lueghamer | |
| 6,156,832 A | 12/2000 | Bertelo et al. | |
| 6,201,053 B1 | 3/2001 | Dieckmann et al. | |
| 6,228,204 B1 * | 5/2001 | Reinhardt et al. | 156/304.2 |
| 6,228,312 B1 | 5/2001 | Boyce | |
| 6,299,820 B1 | 10/2001 | Weinstein | |
| 6,394,502 B1 | 5/2002 | Andersson | |
| 6,398,264 B1 | 6/2002 | Bryant, III | |
| 6,550,500 B2 | 4/2003 | Järvenkyläet et al. | |
| 6,550,514 B1 * | 4/2003 | Andrew | 156/499 |
| 6,608,142 B1 | 8/2003 | Weng et al. | |
| 6,629,547 B1 * | 10/2003 | Yamaguchi et al. | 138/129 |
| 6,946,050 B2 | 9/2005 | Dojan et al. | |
| 6,982,051 B2 | 1/2006 | St. Onge et al. | |
| 6,994,766 B2 * | 2/2006 | Temple | 156/257 |
| 7,269,520 B2 | 9/2007 | Marti et al. | |
| 7,842,769 B1 | 11/2010 | Smith et al. | |
| 2001/0048223 A1 * | 12/2001 | Campbell | 285/21.1 |
| 2001/0050278 A1 | 12/2001 | Chenault | |
| 2003/0080552 A1 | 5/2003 | Genoni | |
| 2004/0074837 A1 | 4/2004 | Vasse et al. | |
| 2005/0131123 A1 | 6/2005 | Hawrylko et al. | |
| 2006/0004399 A1 | 1/2006 | van Ockenburg et al. | |
| 2006/0071365 A1 | 4/2006 | St. Onge et al. | |
| 2007/0068868 A1 | 3/2007 | Vasse et al. | |
| 2008/0257604 A1 | 10/2008 | Becker et al. | |

FOREIGN PATENT DOCUMENTS

| | | |
|---|---|---|
| DE | 41 31 442 A1 | 3/1993 |
| EP | 1041334 A1 | 10/2000 |
| FR | 1390498 | 2/1964 |
| GB | 2 268 431 A | 1/1994 |
| JP | 59-93328 * | 3/1982 |
| JP | 62190396 A | 8/1987 |
| JP | 1110128 A | 4/1989 |
| JP | 02 106325 A | 4/1990 |
| JP | 02107429 A | 4/1990 |
| JP | 3043054 B | 7/1991 |
| JP | 4229231 A | 8/1992 |
| JP | 05-058264 | 8/1993 |
| JP | 6226062 A | 8/1994 |
| JP | 9117641 A | 5/1997 |
| JP | 11-077834 | 3/1999 |
| JP | 2000033517 A | 2/2000 |
| JP | 2002021474 A | 1/2002 |
| JP | 57-48299 | 5/2011 |
| WO | WO 9911361 A1 | 3/1999 |
| WO | WO 0022334 * | 4/2000 |

OTHER PUBLICATIONS

ASTM International Standard Designation: D 638-02a; *Standard Test Method for Tensile Properties of Plastics* Jan. 2003.

ASTM International Standard Designation: D 1784-02; *Standard Specification for Rigid Poly (Vinyl Chloride) (PVC) Compounds and Chlorinated Poly (Vinyl Chloride) (CPVC) Compounds* Feb. 2003.

American Water Works Association ANSI/AWWA C900-97 (Revision of ANSI/AWWA C900-89) AWWA Standard for Polyvinyl Chloride (PVC) Pressure Pipe and Fabricated Fittings, 4 In. Through 12 In. (100 mm Through 300 mm), for Water Distribution, Feb. 1, 1998.

American Water Works Association ANSI/AWWA C905-97 (Revision of ANSI/AWWA C905-88) AWWA Standard for Polyvinyl Chloride (PVC) Pressure Pip and Fabricated Fittings, 14 In. Through 48 In. (350 mm Through 1,200 mm), for Water Transmission and Distribution, Feb. 1, 1998.

NSF/ANSI 61-2003e "Drinking water system components—Health effects"; NSF International Standard/American National Standard, Sep. 3, 2003.

"Standard Specification for Poly(Vinyl Chloride) (PVC) Pressure-Rated Pipe (SDR Series)" ASTM Designation: D 2241-00 (pp. 83-91), Sep. 2000.

"Standard Test Method for Apparent Hoop Tensile Strength of Plastic or Reinforced Plastic Pipe by Split Disk Method" ASTM Designation: D 2290-00 (pp. 99-103), Sep. 2000.

"Standard Test Method for Resistance to Short-Time Hydraulic Pressure of Plastic Pipe, Tubing, and Fittings" ASTM Designation: D 1599-99 (pp. 28-30), Mar. 2000.

"Standard Specification for Oriented Poly(Vinyl Chloride), PVCO, Pressure Pipe" ASTM Designation: D 1483-98 (pp. 1175-1179), Mar. 1999.

Plastic Pipe Institute, "PPI PVC Range Composition Listing of Qualified Ingredients" TR-2/2008a, (pp. 1-44) Jul. 2008.

U.S. Appl. No. 10/788,921, filed Feb. 26, 2004.

U.S. Appl. No. 11/005,306, filed Dec. 6, 2004.

U.S. Appl. No. 12/102,298, filed Apr. 14, 2008.

American Water Works Association, ANSI/AWWA C905-10 (Revision of ANSI/AWWA C905-97), AWWA Standard Polyvinyl Chloride (PVC) Pressure Pipe and Fabricated Fittings, 14 In. Through 48 In. (350 MM Through 1,200 MM), Jan. 17, 2010.

American Water Works Association, ANSI/AWWA C900-07 (Revision of ANSI/AWWA C900-97), AWWA Standard Polyvinyl Chloride (PVC) Pressure Pipe and Fabricated Fittings, 4 In. Through 12 In. (100 MM Through 300 MM), for Water Transmission and Distribution, Jun. 24, 2007.

ASTM International Standard Designation: D 1784-02; Standard Specification for Rigid Poly (Vinyl Chloride) (PVC) Compounds and Chlorinated Poly (Vinyl Chloride) (CPVC) Compounds.

ASTM International Standard Designation: D 1785-06; Standard Specification for Poly (Vinyl Chloride) (PVC) Plastic Pipe, Schedules 40, 80, and 120.

Shah Rahman, "Suitability of PVC Pipe Installation by Various Trenchless Methods: A State-of-the-Art Review of Products and Processes", Jan. 13, 2004.

Zhao et al., "Effect of Joint Contamination on the Quality of Butt-Fused High-Density Polyethylene (HDPE) Pipe Joints"; Institute for Research in Construction 2002; http://www.nrc-cnrc.gc.ca/obj/irc/doc/pubs/nrcc45337/nrcc45337.pdf.

David W. Woods et al.; *Pipeline Rehabilitation with Expanded and Oriented PVC*; Underground Infrastructure Advanced Technology Conference, Washington, DC; Dec. 8-9, 2003.

American Water Works Association, ANSI/AWWA C906-99 (Revision of ANSI/AWWA C906-90), AWWA Standard for Polyehtylene (PE) Pressure Pipe and Fittings, 4 In. (100 mm) Through 63 In. (1,575 mm), for Water Distribution and Transmission, Mar. 1, 2000.

ISCO Industries; Large Diameter Butt Fusion; http://www.isco-pipe.com/products_services/buttfusion_animation.htm; May 14, 2009; illustrations copyrighted in 1996.

* cited by examiner

PVC BUTT FUSION CHART: PVC AWWA PIPE

C.I.O.D. SIZES C900 AND C905 STANDARDS
CELL CLASS 12454B   ASTM D 1784

| PIPE DIAMETER (NOMINAL) | OUTSIDE DIAMETER (INCHES) | INSIDE DIAMETER (INCHES) | SURFACE AREA (SQ. INS.) | GAUGE* PRESSURE (PSI) | DR DIAMETER RATIO |
|---|---|---|---|---|---|
| 4 | 4.80 | 4.42 | 2.75 | 385 | 25 |
| 4 | 4.80 | 4.27 | 3.78 | 529 | 18 |
| 4 | 4.80 | 4.11 | 4.83 | 715 | 14 |
| 6 | 6.90 | 6.35 | 5.73 | 802 | 25 |
| 6 | 6.90 | 6.13 | 7.88 | 1103 | 18 |
| 6 | 6.90 | 5.91 | 9.96 | 1395 | 14 |
| 8 | 9.05 | 8.33 | 9.04 | 1266 | 25 |
| 8 | 9.05 | 8.05 | 12.64 | 1771 | 18 |
| 8 | 9.05 | 7.76 | 16.24 | 2275 | 14 |
| 10 | 11.10 | 10.21 | 14.89 | 2085 | 25 |
| 10 | 11.10 | 9.87 | 20.25 | 2835 | 18 |
| 10 | 11.10 | 9.51 | 25.73 | 3602 | 14 |
| 12 | 13.20 | 12.15 | 20.91 | 2927 | 25 |
| 12 | 13.20 | 11.73 | 28.78 | 4030 | 18 |
| 12 | 13.20 | 11.31 | 36.38 | 5093 | 14 |
| 14 | 15.30 | 14.10 | 27.71 | 3880 | 25 |
| 16 | 17.40 | 16.00 | 36.73 | 5142 | 25 |
| 18 | 19.50 | 17.90 | 47.00 | 6580 | 25 |
| 20 | 21.60 | 19.90 | 55.41 | 7758 | 25 |
| 24 | 25.80 | 23.70 | 81.64 | 11430 | 25 |
| 30 | 32.00 | 29.40 | 148.94 | 20850 | 25 |
| 36 | 38.30 | 35.20 | 178.96 | 25055 | 25 |

INTERFACIAL PRESSURE: 140 PSI.   PLATE: 415°F (213°C)
* CYLINDER AREA (Cn) BASED ON 1.00

Fig. 4

PVC BUTT FUSION CHART: PVC SERIES PIPE
SDR 41     CELL CLASS 12454 B  ASTM D 1784

| PIPE DIAMETER (NOMINAL) | OUTSIDE DIAMETER (INCHES) | INSIDE DIAMETER (INCHES) | SURFACE AREA (SQ. INS.) | GAUGE* PRESSURE (PSI) |
|---|---|---|---|---|
| 4 | 4.50 | 4.278 | 1.53 | 215 |
| 6 | 6.63 | 6.282 | 3.48 | 487 |
| 8 | 8.62 | 8.180 | 5.87 | 823 |
| 10 | 10.75 | 10.194 | 9.14 | 1280 |
| 12 | 12.75 | 12.093 | 12.82 | 1795 |
| 14 | 14.00 | 13.277 | 15.49 | 2169 |
| 16 | 16.00 | 15.174 | 20.22 | 2832 |
| 18 | 18.00 | 17.071 | 25.51 | 3572 |
| 20 | 20.00 | 18.985 | 31.08 | 4350 |
| 24 | 24.00 | 22.756 | 45.69 | 6400 |

INTERFACIAL PRESSURE: 140 PSI.     PLATE: 415°F (213°C)
* CYLINDER AREA (Cn) BASED ON 1.00

Fig. 5

PVC BUTT FUSION CHART: PVC SERIES PIPE
SDR 32.5     CELL CLASS 12454 B  ASTM D 1784

| PIPE DIAMETER (NOMINAL) | OUTSIDE DIAMETER (INCHES) | INSIDE DIAMETER (INCHES) | SURFACE AREA (SQ. INS.) | GAUGE* PRESSURE (PSI) |
|---|---|---|---|---|
| 3 | 3.50 | 3.271 | 1.22 | 170 |
| 4 | 4.50 | 4.208 | 2.00 | 279 |
| 6 | 6.63 | 6.194 | 4.57 | 640 |
| 8 | 8.62 | 8.063 | 7.37 | 1032 |
| 10 | 10.75 | 10.049 | 11.45 | 1604 |
| 12 | 12.00 | 11.921 | 16.06 | 2250 |
| 14 | 14.00 | 13.090 | 19.36 | 2710 |
| 16 | 16.00 | 14.957 | 23.36 | 3550 |
| 18 | 18.00 | 16.823 | 32.20 | 4508 |
| 20 | 20.00 | 18.698 | 39.58 | 5540 |
| 24 | 24.00 | 22.431 | 57.22 | 8010 |

INTERFACIAL PRESSURE: 140 PSI.     PLATE: 415°F (213°C)
* CYLINDER AREA (Cn) BASED ON 1.00

Fig. 6

PVC BUTT FUSION CHART: PVC SERIES PIPE

SDR 26                        CELL CLASS 12454 B   ASTM D 1784

| PIPE DIAMETER (NOMINAL) | OUTSIDE DIAMETER (INCHES) | INSIDE DIAMETER (INCHES) | SURFACE AREA (SQ. INS.) | GAUGE* PRESSURE (PSI) |
|---|---|---|---|---|
| 3 | 3.50 | 3.215 | 1.50 | 210 |
| 4 | 4.50 | 4.134 | 2.48 | 348 |
| 6 | 6.63 | 6.085 | 5.39 | 755 |
| 8 | 8.62 | 7.921 | 9.15 | 1282 |
| 10 | 10.75 | 9.874 | 14.18 | 1987 |
| 12 | 12.75 | 11.717 | 19.85 | 2780 |
| 14 | 14.00 | 12.857 | 24.11 | 3375 |
| 16 | 16.00 | 14.698 | 31.39 | 4395 |
| 18 | 18.00 | 16.531 | 39.84 | 5580 |
| 20 | 20.00 | 18.364 | 49.29 | 6900 |
| 24 | 24.00 | 22.039 | 70.90 | 9927 |

INTERFACIAL PRESSURE: 140 PSI.         PLATE: 415°F (213°C)
* CYLINDER AREA (Cn) BASED ON 1.00

Fig. 7

PVC BUTT FUSION CHART: PVC SERIES PIPE

SDR 21                        CELL CLASS 12454 B   ASTM D 1784

| PIPE DIAMETER (NOMINAL) | OUTSIDE DIAMETER (INCHES) | INSIDE DIAMETER (INCHES) | SURFACE AREA (SQ. INS.) | GAUGE* PRESSURE (PSI) |
|---|---|---|---|---|
| 3 | 3.50 | 3.146 | 1.85 | 258 |
| 4 | 4.50 | 4.046 | 3.05 | 427 |
| 6 | 6.62 | 5.957 | 6.60 | 924 |
| 8 | 8.63 | 7.756 | 11.18 | 1566 |
| 10 | 10.75 | 9.665 | 17.35 | 2430 |
| 12 | 12.75 | 11.467 | 24.40 | 3416 |
| 14 | 14.00 | 12.589 | 29.47 | 4125 |
| 16 | 16.00 | 14.381 | 38.63 | 5409 |
| 18 | 18.00 | 16.180 | 48.86 | 6840 |
| 20 | 20.00 | 17.980 | 60.26 | 8436 |
| 24 | 24.00 | 21.580 | 86.63 | 12128 |

INTERFACIAL PRESSURE: 140 PSI.         PLATE: 415°F (213°C)
* CYLINDER AREA (Cn) BASED ON 1.00

Fig. 8

PVC BUTT FUSION CHART: PVC SERIES PIPE

SCH 80 INDUSTRIAL IPS                CELL CLASS 12454 B  ASTM D 1784

| PIPE DIAMETER (NOMINAL) | OUTSIDE DIAMETER (INCHES) | INSIDE DIAMETER (INCHES) | SURFACE AREA (SQ. INS.) | GAUGE* PRESSURE (PSI) | DR DIAMETER (RATIO) |
|---|---|---|---|---|---|
| 3 | 3.50 | 2.864 | 3.18 | 445 | 12 |
| 4 | 4.50 | 3.786 | 4.65 | 651 | 13 |
| 6 | 6.63 | 5.709 | 8.57 | 1243 | 16 |
| 8 | 8.62 | 7.565 | 13.48 | 1888 | 17 |
| 10 | 10.75 | 9.493 | 19.98 | 2798 | 18 |
| 12 | 12.75 | 11.294 | 27.50 | 3850 | 19 |
| 14 | 14.00 | 12.412 | 32.94 | 4612 | 19 |
| 16 | 16.00 | 14.224 | 42.16 | 5902 | 19 |
| 18 | 18.00 | 16.014 | 53.05 | 7428 | 19 |
| 20 | 20.00 | 17.814 | 64.92 | 9088 | 20 |
| 24 | 24.00 | 21.418 | 92.10 | 12895 | 20 |

INTERFACIAL PRESSURE: 140 PSI.                PLATE: 415 F (213 C)

\* CYLINDER AREA (Cn) BASED ON 1.00

Fig. 9

FUSION PROCESS FOR CONDUIT

CROSS REFERENCE TO RELATED APPLICATIONS

This application is a continuation of U.S. patent application Ser. No. 10/788,921, filed Feb. 26, 2004, now U.S. Pat. No. 6,982,051 which takes priority from U.S. Provisional Patent Application No. 60/478,313, filed Jun. 13, 2003, which are both herein incorporated by reference in their entirety.

BACKGROUND OF THE INVENTION

1. Field of the Invention

The present invention relates generally to systems for fusing or joining conduit or piping sections, such as polyvinyl chloride piping and, in particular, to a fusion process for effectively and permanently joining a first conduit portion to a second conduit portion.

2. Description of Related Art

Conduit systems are used in many applications throughout the world in order to transfer or convey material, such as water and other fluids, from location to location for distribution throughout the system. For example, extensive conduit systems are used to distribute water to both residences and businesses for use and further processes. Typically, such conduit or piping systems are located underground, as aboveground piping would be both unsightly and intrusive.

In general, water conduit systems transport material through piping manufactured from various materials, e.g., cast iron, ductile iron, reinforced concrete, cement-asbestos, etc. The pipes are buried underground, with the branches extending in various directions in order to reach the end user. Normally, after many years of use, or for some other reason, the in-ground piping fails and begins to leak, thereby reducing line pressure and unnecessarily allowing water to leak into the area surrounding the piping. Such leaks not only affect the system, but also increase the processing costs of the supplier, which, in turn, increases the end user costs. Therefore, these leaks must be quickly repaired and preventative measures taken to ensure that further leakage is prevented.

Due to the underground position of the conduit system, repairing a leaking pipe is particularly labor intensive and time consuming. Trenches must be dug along the pipeline to locate the leak and effectively repair it prior to putting the pipe back in service. Various lining systems have been developed according to the prior art in an attempt to seal a leaking pipe or a pipe that has fallen into disrepair, whether to repair a present crack or to preventatively ensure against future cracks or breaks. In addition, a method whereby a much smaller diameter pipe within the larger diameter cracked or broken pipe has been used. However, this merely replaces the problem of a cracked outer pipe with a cracked or otherwise leaking inner pipe. Still further, using such a pipe-in-pipe system drastically reduces the flow through the conduit system and evidences unwanted and varying pressure parameters.

To that end, a pipe liner and method of installation have been developed, as disclosed in U.S. Pat. No. 5,794,662 to St. Onge et al., specifically directed to pressurized pipeline applications. The St. Onge patent is directed to a method of relining sewer lines, water lines or gas lines, and uses a segmented liner of reduced size relative to the pipe being relined. However, as opposed to merely leaving the small diameter liner conduit within the large diameter outer conduit, the method of the St. Onge patent uses heat and/or pressure to mold the reduced size pipe to the shape of the pipe being relined. In particular, the inner or liner conduit is a thermoplastic pipe, typically a polyvinyl chloride (PVC) pipe that, when exposed to heat or pressure, expands and molds against the inside of an existing conduit to effect the relining of it. This process allows for both the lining of the entire length of pipe or only a portion of it that is damaged, which is typically referred to as "spot repair."

According to the St. Onge patent, once the length of the liner conduit is inserted into the existing or host conduit, the liner conduit is plugged at either end and exposed to steam under pressure to heat the liner conduit along its length and apply pressure, which urges it to expand and contact the interior walls of the surrounding host conduit. Once the liner conduit has fully expanded to conform to the interior surface of the existing conduit, it is cooled and the plugs are removed. The resulting expanded liner conduit conforms to the walls of the host conduit, thereby preventing any further leakage. Also, the method of the St. Onge patent requires only trenches to be dug at either end of the section to be repaired.

While the St. Onge patent represents an advance in the art of relining or repairing underground conduit systems, there is room in the art for additional improvements and advancements. Specifically, in order to transport and insert the liner conduit within the host conduit, the liner conduit must be manufactured in sections or portions, which are typically much shorter in length than the final and intended liner conduit length. Therefore, portions of the liner conduit must be connected onsite as the liner conduit is fed into the host conduit. In addition, there is a need for the ability to connect multiple lengths of the liner conduit via a joint having the strength of the original conduit and which does not increase the diameter of the joint area beyond the original conduit diameter. The use of multiple and connectable conduit pieces is useful in many different applications beyond the above-discussed expansion application. For example, the use of multiple and fused conduits is particularly useful in the case of sliplining, wherein a slightly smaller diameter fused conduit is inserted into a larger pipe that is in need of rehabilitation, but that does not require a full capacity for flow. In this case, the conduit is pulled in and left in place, but is not expanded. In most cases, the space between the conduit and the host pipe is filled with a low-strength grout to hold the new line in position. However, the sliplining process may require the use of lines that could accommodate a larger diameter coupling or mechanical joint.

Fused conduit is also required in various other applications, such as in a rehabilitation application, wherein the fused joint is used in connection with a horizontal directional drilling process. This method drills a pilot hole in the ground and can be steered in a precise manner to control elevation and alignment. After the pilot hole is complete, the drill hole is reamed to a larger diameter and filled with drill mud to hold the larger hole open. The drill casing is then pulled through the drill mud resulting in a conduit in place. However, this process requires a larger drill to accommodate the mechanical couplings and joints manufactured from PE or HDPE.

Further, fused conduit is useful in a pipe bursting application. Pipe bursting uses a large hydraulic or pneumatic cutter head to break apart old pipe and force the pieces into the surrounding soil. This allows a new pipe of equal or larger diameter in the existing line to be pulled in. This process is used where the new line capacity must be substantially increased. Also, of course, fused pipe is equally useful in a direct-bury application.

Fusion processes for pipe or conduit have been developed that utilize mechanical joints, embedded wires at or near the fusion joint or resistive heating elements for joining conduit sections together. For example, see U.S. Pat. No. 6,398,264 to Bryant, III; U.S. Pat. No. 6,394,502 to Andersson; U.S. Pat. No. 6,156,144 to Lueghamer; U.S. Pat. No. 5,921,587 to Lueghamer; U.S. Pat. No. 4,684,789 to Eggleston; and U.S. Pat. No. 4,642,155 to Ramsey. Polyethylene pipe (PE or HDPE) has been routinely fused for many years. For example, see U.S. Pat. No. 3,002,871 to Tramm et al.; U.S. Pat. No. 4,987,018 to Dickinson et al.; U.S. Pat. No. 4,963,421 to Dickinson et al.; and U.S. Pat. No. 4,780,163 to Haneline, Jr. et al. and U.S. Patent Publication No. 2003/0080552 to Genoni. Accordingly, preexisting fusion equipment is available. However, this equipment must be modified in its use and operating parameters for fusion of polyvinyl chloride-based conduit. Unlike polyethylene pipe, which is generally joined by heat fusion techniques, PVC pipe has normally been limited to applications that can be serviced by bell-and-spigot joints. This limitation has restricted the use of PVC pipe in sliplining rehabilitation applications. Therefore, there is a need in the art to provide an essentially single piece of PVC liner conduit starting stock with no mechanical joints, which does not increase the diameter of the starting stock as a mechanical coupling would. Such a coupling or fused joint must have similar strength characteristics as the original conduit and preclude infiltration in joints, by eliminating such mechanical joints. In addition, it may be preferable to provide a coupling that is capable of withstanding a subsequent expansion process for eventual use in a pressurized conduit system.

SUMMARY OF THE INVENTION

It is, therefore, an object of the present invention to provide a fusion process for PVC conduit that overcomes the deficiencies of the prior art. It is another object of the present invention to provide a fusion process for PVC conduit that allows for the onsite connection of multiple lengths of PVC conduit. It is a still further object of the present invention to provide a fusion process for PVC conduit that results in a joint that equals the strength of the original conduit and does not increase the diameter of the joint area beyond the original conduit diameter. It is a further object of the present invention to provide a fusion process for PVC conduit that provides a single piece of starting stock with no mechanical joints, which precludes infiltration through these joints. It is yet another object of the present invention to provide a fusion process for PVC conduit that produces a joint that is capable of subsequent expansion and use in pressurized conduit system. It is another object of the present invention to provide a fusion process for PVC that produces a joint that is consistent and has high strength characteristics. It is a further object of the present invention to provide a fusion process and apparatus that can be effectively used in connection with fused pipes and joints in sliplining applications, horizontal directional drilling applications, pipe bursting applications and direct-bury applications.

The present invention is directed to a fusion process for conduit. The fusion process includes an apparatus and a method of fusing a first conduit portion to a second conduit portion. The method includes the steps of: (a) removably positioning a first terminal edge of a first conduit portion in an opposing relationship with a first terminal edge of a second conduit portion; (b) facing the first terminal edge of the first conduit portion and the first terminal edge of the second conduit portion; (c) aligning the first terminal edge of the first conduit portion with the first terminal edge of the second conduit portion; (d) melting at least a portion of the first terminal edge of the first conduit portion and the first terminal edge of the second conduit portion; (e) engaging the melted terminal edge of the first conduit portion with the melted terminal edge of the second conduit portion; and (f) maintaining pressure between the engaged terminal edge of the first conduit portion and the terminal edge of the second conduit portion, thereby creating a fused joint area. This method is employed where one or both of the first conduit portion and the second conduit portion are manufactured from a polyvinyl chloride (PVC) material. The present invention also discloses the novel operating parameters of a fusion apparatus for use in connecting a first conduit portion to a second conduit portion.

The present invention is also directed to a fusion apparatus for fusing a first conduit portion to a second conduit portion. The apparatus includes a first clamping mechanism for engaging and positioning the first conduit portion and a second clamping mechanism for engaging and positioning the second conduit portion. A drive mechanism is in operable communication with one or both of the first and second clamping mechanisms for driving them in a longitudinal direction. A facing mechanism is positionable between a terminal edge of the first conduit portion and a terminal edge of the second conduit portion. The facing mechanism "faces" or shaves these terminal edges. A heater mechanism heats and melts one or both of the terminal edges of the conduit portions. One or both of the conduit portions are manufactured from a polyvinyl chloride (PVC) material.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 4 is a chart providing gauge pressure for specific cast iron outside diameter ranges;

FIG. 5 is a chart providing gauge pressure for PVC pipe with a standard dimension ratio of 41 over a range of pipe diameters;

FIG. 6 is a chart providing gauge pressure for PVC pipe with a standard dimension ratio of 32.5 over a range of pipe diameters;

FIG. 7 is a chart providing gauge pressure for PVC pipe with a standard dimension ratio of 26 over a range of pipe diameters;

FIG. 8 is a chart providing gauge pressure for PVC pipe with a standard dimension ratio of 21 over a range of pipe diameters; and FIG. 9 is a chart providing gauge pressure for PVC pipe having a variable dimension ratio and a specified wall thickness over a range of pipe diameters.

DESCRIPTION OF THE PREFERRED EMBODIMENTS

Figure 1:
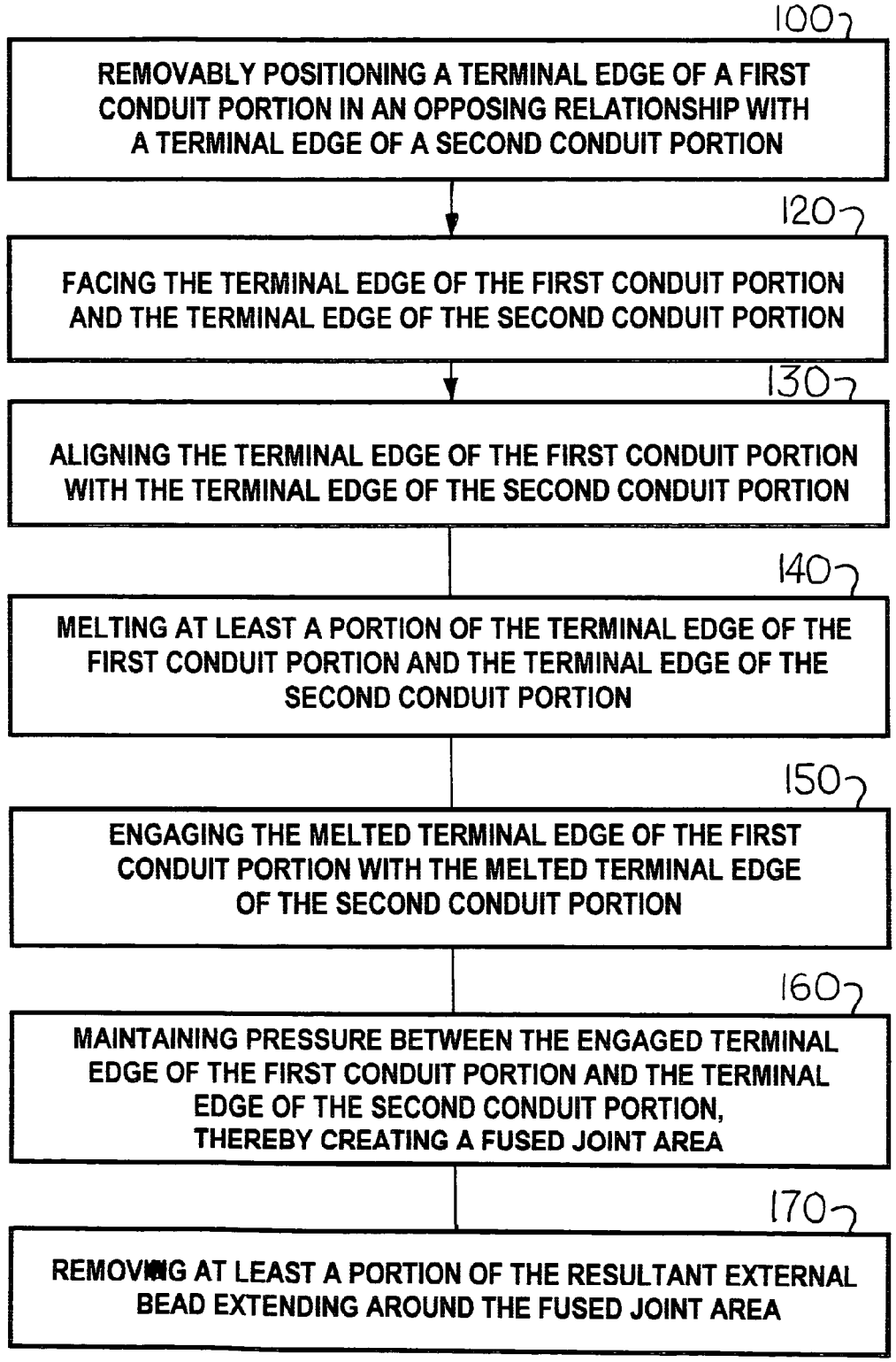
FIG. 1 is a schematic view of a method for a fusion process for conduit according to the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Various numerical ranges are disclosed in this patent application. Because these ranges are continuous, they include every value between the minimum and maximum values. Unless expressly indicated otherwise, the various numerical ranges specified in this application are approximations.

The present invention is directed to a fusion process for conduit, preferably a polyvinyl chloride (PVC) conduit, including a method for fusing a first conduit portion 10 to a second conduit portion 12, as illustrated in schematic form in FIG. 1, and a fusion apparatus 14 for employing this method. In a preferred embodiment, the method and fusion apparatus 14 may be used in connection with a conduit expansion process and system, whereby a liner conduit 16, which is formed from multiple conduit portions, e.g., the first conduit portion 10 and the second conduit portion 12, is positioned within a host conduit for later expansion. However, the method and fusion apparatus 14 may be used in any application that requires successive fusion of conduit portions. As set forth above, the liner conduit 16 is manufactured from a thermoplastic material, such as PVC. However, it is envisioned that any material having the appropriate expansion characteristics can be used and connected according to the method of the present invention. The fusion process for PVC conduit will work effectively with other similar expandable polymeric-based materials and thermoplastics.

ASTM standards for PVC pipe are available for ranges of additives to PVC resin that have various properties within the allowable bands of additives. However, not all the possible combinations of additives will work in the conduit expansion process. That is to say that not all PVC water pipe will fuse to the strength of the pipe material of the liner conduit and not all PVC pipe will expand to the size of the pipe material of the liner conduit.

Since the conduit expansion process occurs at remote locations, the liner conduit 16 must be transported in sections for later installation. Therefore, while the present invention specifically discusses the connection and fusion of the first conduit portion 10 to the second conduit portion 12, the method and fusion apparatus 14 are equally useful in connecting any number and length of liner conduit 16 portions. Therefore, in a further preferred and non-limiting embodiment, the fusion apparatus 14 is mobile and can be used onsite to employ the presently invented method.

In particular, the present method includes the steps of: removably positioning a terminal edge 18 of the first conduit portion 10 in an opposing relationship with a terminal edge 20 of the second conduit portion 12 (step 100); facing the terminal edge 18 of the first conduit portion 10 and the terminal edge 20 of the second conduit portion 12 (step 120); aligning the terminal edge 18 of the first conduit portion 10 with the terminal edge 20 of the second conduit portion 12 (step 130); melting at least a portion of the terminal edge 18 of the first conduit portion 10 and the terminal edge 20 of the second conduit portion 12 (step 140); engaging the melted terminal edge 18 of the first conduit portion 10 with the melted terminal edge 20 of the second conduit portion 12 (step 150); and maintaining pressure between the engaged terminal edge 18 of the first conduit portion 10 and the terminal edge 20 of the second conduit portion 12, thereby creating a fused joint area 22 (step 160). In a preferred and non-limiting embodiment, the method further includes the step of removing at least a portion of the resultant external bead 24 extending around the fused joint area 22 (step 170). This method is performed by the fusion apparatus 14, which is described in detail hereinafter.

Figure 2:
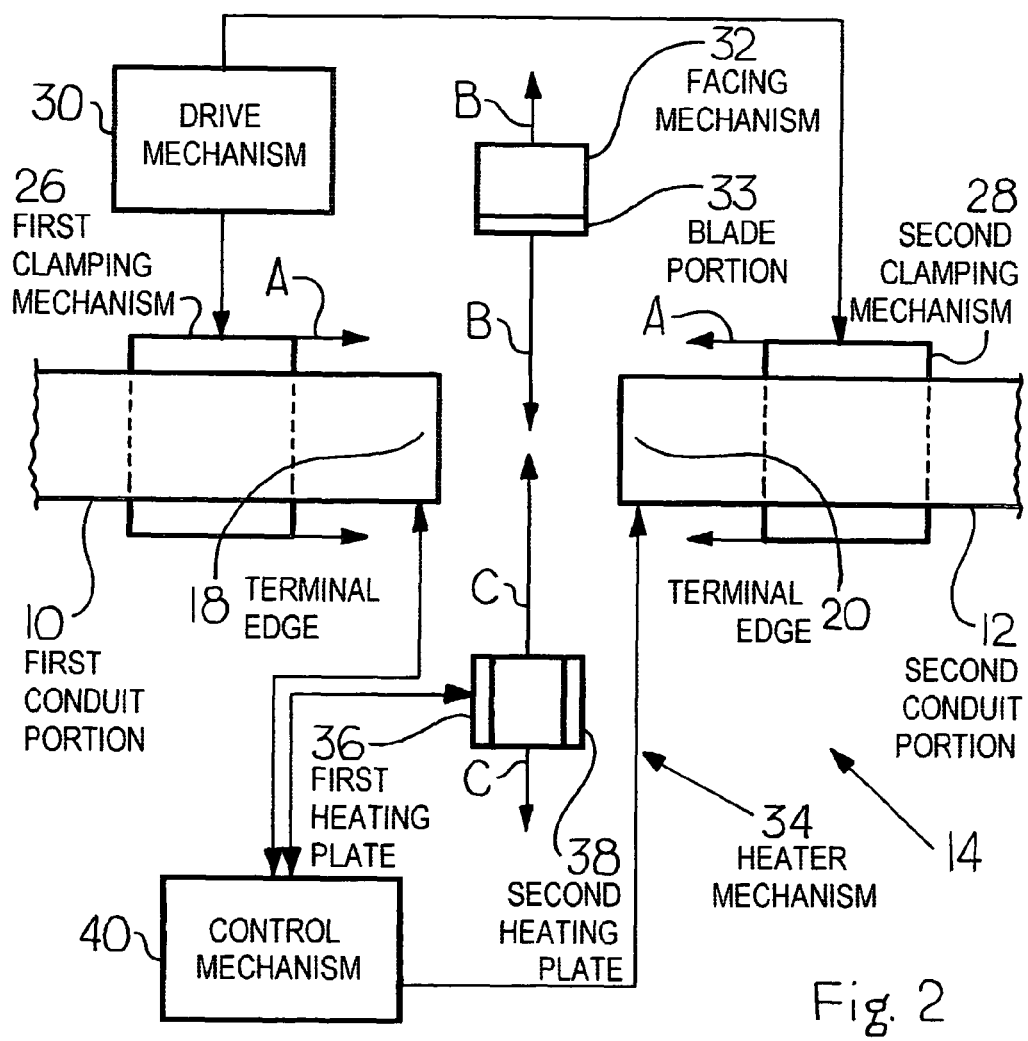
FIG. 2 is a schematic view of an apparatus and system for a fusion process for conduit according to the present invention.
Figure 3:
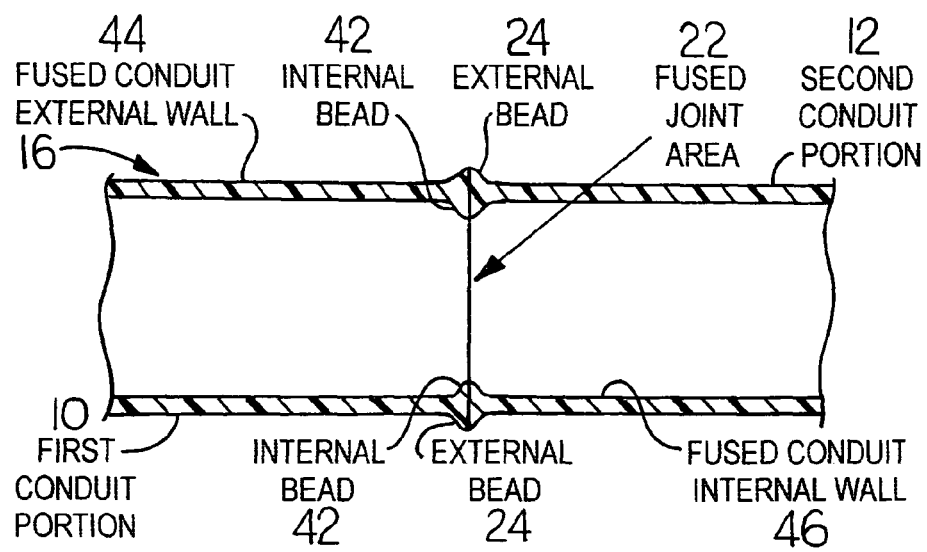
FIG. 3 is a side sectional view of a fused joint area resulting from the fusion process for conduit according to FIG. 1.

Regarding step 100, the terminal edge 18 of the first conduit portion 10 is clamped or held in place and positioned by a first clamping mechanism 26, while the second conduit portion 12 is clamped and positioned by a second clamping mechanism 28. The first clamping mechanism 26 and the second clamping mechanism 28 are part of the fusion apparatus 14 and allow for the removable positioning of the first conduit portion 10 and the second conduit portion 12. Further, both the first clamping mechanism 26 and the second clamping mechanism 28 are capable of being driven in a longitudinal direction, designated as arrows A in FIG. 2. Therefore, a drive mechanism 30 is in operable communication with the first clamping mechanism 26 and/or second clamping mechanism 28 for providing the necessary driving force to move the first clamping mechanism 26 and/or the second clamping mechanism 28 into or out of an engaging position.

The terminal edge 18 of the first conduit portion 10 and the terminal edge 20 of the second conduit portion 12 must be faced in order to establish a clean and parallel mating surface. This facing is completed by a facing mechanism 32, which is positionable between the terminal edge 18 of the first conduit portion 10 and the terminal edge 20 of the second conduit portion 12. For example, the facing mechanism 32 may be laterally movable into and out of position between the terminal edges (18, 20), as designated by arrows B in FIG. 2. The facing mechanism 32 continues to grind or face the terminal edges (18, 20) until a minimal distance exists between the first clamping mechanism 26 and the second clamping mechanism 28. In a preferred and non-limiting embodiment, the facing mechanism 32 includes one or more blade portions 33. These blade portions 33 perform the actual cutting or facing operation with respect to the terminal edges (18, 20) of the conduit portions (10, 12). In a further embodiment, the blade portions 33 are carbide-tipped blades, which allows for better consistency and a cleaner facing process. Further, these carbide-tipped blades allow for more frequent usage of the blade portions 33 without wearing the cutting edge of the blade portions 33. Of course, the use of other strengthened blade tips, coatings, structures and materials is also envisioned.

It should be noted that both the first clamping mechanism 26 and the second clamping mechanism 28 need not be movable, only one of which is required to be movable to allow the first conduit portion 10 and the second conduit portion 12 to be engaged. In operation, one or both of the first clamping mechanism 26 and the second clamping mechanism 28 are moved, such that the facing mechanism 32 is locked firmly and squarely between the first clamping mechanism 26 and the second clamping mechanism 28. This operation provides for a substantially square face, perpendicular to the first conduit portion 10 and second conduit portion 12 centerline and with no detectable gap. Further, the facing mechanism 32 may include blades with various angular orientations. This will provide a smoother face on the conduit portions (10, 12).

Next, the first conduit portion 10 and second conduit portion 12 profiles must be rounded and aligned with each other in order to minimize any mismatch of the conduit walls. This may be accomplished by adjusting the first clamping mechanism 26 and/or the second clamping mechanism 28 until the outside diameter of the first conduit portion 10 matches the outside diameter of the second conduit portion 12. It is desirable that the first clamping mechanism 26 and the second clamping mechanism 28 not be loosened, which would result in either the first conduit portion 10 and/or the second conduit portion 12 slipping during the fusion process. The minimal distance requirement between the first clamping mechanism 26 and the second clamping mechanism 28 allows the first conduit portion 10 and/or the second conduit portion 12 to be rounded as close as possible to the intended joint area. The closer to the joint area that the conduit portions (10, 12) can be clamped, the better control the operator has in properly aligning the conduit portions (10, 12).

Next, the terminal edge 18 of the first conduit portion 10 and the terminal edge 20 of the second conduit portion 12 are heated or melted to the required temperature, interface pressure and time duration. In doing so, the heat will penetrate into the first conduit portion 10 and second conduit portion 12 and a molten "bead" of material will form at the terminal edges (18, 20). This heating process is effected by a heater mechanism 34, which heats and melts both terminal edges (18, 20) simultaneously. This simultaneous heating can be accomplished by the use of a first heating plate 36 and a second heating plate 38, a single dual-faced heating plate or other means of simultaneous heating of both terminal edges (18, 20). As with the facing mechanism, the heater mechanism 34 should be capable of moving into position between the terminal edges (18, 20), until such time as the heating process is complete, at which point the heater mechanism 34 should be removed. Therefore, the heater mechanism 34 should also be movable, such as laterally movable between the terminal edges (18, 20), as designated by arrows C in FIG. 2. In a further preferred and non-limiting embodiment, the heater mechanism 34 provides for zone heating with respect to the surface of the heater mechanism 34, the first heating plate 36 and/or the second heating plate 38. Accordingly, various portions of the heating surface, for example, the upper and the lower surface, may have different temperatures. This, in turn, allows for a more uniform melting of the terminal edges (18, 20), due to the natural physics of the heating process, wherein heat rises and provides a differential heating interface across the terminal edges (18, 20). Therefore, the zone heating would provide for a uniform profile across the terminal edges (18, 20). It is also envisioned that the heater mechanism includes multiple zones that are controlled or controllable by a control mechanism 40. This control mechanism 40 would provide for the individual control of each zone to maximize the efficiency and accuracy of the heater mechanism 34, with a resultant more uniform profile across the terminal edges (18, 20). The speed of removal of the heater mechanism 34 after the heating process, together with the speed of clamping the terminal edges (18, 20) together is also important. The time interval is preferably short, e.g., 3 to 4 seconds.

It is also envisioned that the control mechanism 40, typically integrated with one or more measurement devices, is employed by the fusion apparatus 14 to control the components. For example, the first heating plate 36 and/or the second heating plate 38 may be equipped with thermometers to measure plate temperatures with an accompanying control for setting and holding these temperatures. However, it may be that these thermometers can only be used as general indicators due to the inaccuracies between a thermometer and the actual surface temperature of the terminal edges (18, 20). In this regard, a pyrometer or other surface temperature-measuring device may be integrated with the control mechanism 40 and used periodically to ensure proper temperature of the first heating plate 36 and/or the second heating plate 38. It is further envisioned that any of the control mechanism 40, the thermometers or other surface temperature measuring devices are digital devices, that provide a more accurate measure and control of the heat applied by the heater mechanism 34. Such digital control is especially beneficial when the fusion apparatus 14 is used in connection with PVC conduit, as the physical chemistry of PVC, including its melting temperature and curing temperature require much more precision than the use of such a fusion apparatus 14 in connection with PE or HDPE. Therefore, this digital control, in combination with the zone heating, provides enhanced control characteristics to the fusion apparatus 14 of the present invention.

Further, the surfaces of the heating plates (36, 38) should be kept clean, and any coating on the heating plates (36, 38) should not be scratched or damaged in any way. After the terminal edges (18, 20) have been heated for the proper time and to the proper temperature, as discussed hereinafter, the heater mechanism 34 is removed and the molten terminal edges (18, 20) are brought together with sufficient pressure to properly mix the conduit materials to form a homogenous joint, referred to as a fused joint area 22.

In particular, FIG. 4 is a chart for providing a gauge pressure as detailed above. In particular, FIG. 4 is directed to pipe having a specified cast iron outside diameter (CIOD), which may also be referred to as ductile iron pipe size (DIPS). The CIOD or DIPS is a common sizing convention for pressure in municipal water pipes, as set forth in the appropriate AWWA Standards. With respect to polyvinyl chloride pipe, the outside diameter and dimension ratio (DR) is used to determine wall thickness. Dimension ratio is the quotient derived from the division of the outside diameter by the minimum wall thickness.

FIG. 5 is a chart providing gauge pressure for another common sizing convention of PVC pipe. Specifically, this convention is referred to as a Series or Iron Pipe Size (IPS) pipe. In this convention, the outside diameter is somewhat smaller than the CIOD or the DIPS size for the same nominal diameter. Accordingly, the standard dimension ratio (SDR) is defined as being identical to the dimension ratio in CIOD pipe. Therefore, SDR is used with Series or IPS pipe, whereas DR is used with CIOD or DIPS pipe. FIG. 5 provides the gauge pressure for standard IPS or Series sizes with an SDR of 41.

FIG. 6 also provides gauge pressure as discussed above in connection with FIG. 5. However, in FIG. 6, the nominal three-inch figure has been added, and the SDR is 32.5. FIG. 7 also provides gauge pressure, where the SDR is 26, and FIG. 8 still further provides gauge pressure, where the SDR is 21.

Finally, FIG. 9 is a chart that is similar to FIG. 8, except FIG. 9 introduces a variable dimension ratio for use when piping is sized by Schedule. Industrial use IPS sized pipe wall thickness is typically referred to as Schedule 40 or Schedule 80. This scheduling indicates a certain pressure rating and dimension ratio by size, as listed in FIG. 9.

The fused joint area 22 must be held immobile under pressure until cooled adequately to develop the appropriate strength. The hydraulic pressure provided by the first clamping mechanism 26 and the second clamping mechanism 28 should accomplish this. Allowing proper times under pressure for cooling prior to removal from the first clamping mechanism 26 and the second clamping mechanism 28 is important in achieving joint integrity.

After the fusion process, the fused joint area 22 evidences the external bead 24, as well as an internal bead 42, as a result of the applied pressure to the melted material. The external bead 24 extends away from the fused conduit external wall 44, and similarly, the internal bead 42 extends inward from the fused conduit internal wall 46. The external bead 24 should be removed prior to using the liner conduit 16 in the conduit expansion process and system. Specifically, the external bead 24 should be removed to allow for full expansion of the liner conduit 16 within the host conduit when subsequently used in an expansion process. The external bead 24 is typically substantially removed or machined to within ⅛ to 1/16 of an inch of the fused conduit external wall 44. Typically, the internal bead 42 need not be removed and does not provide unnecessary adverse conditions within the liner conduit 16. However, if such a bead 42 would be deemed adverse to the flow of material, the internal bead 42 may also be removed.

If the fusion process is unsuccessful or otherwise faulty, the fused joint area 22 may be simply cut and removed, and the process repeated. However, the reasons the fused joint area 22 was faulty should be logged, for example, in the control mechanism 40. Fusion process diagnostics and data may also be processed, analyzed and presented by the control mechanism 40.

With respect to the fusion process operating parameters, the typical formula used in calculating fusion apparatus 14 gauge pressure using PVC liner conduit 16 is:

$$MGp = \frac{\frac{\pi(OD^2 - ID^2)}{4} \times Ip}{Ca}$$

Further, the formula for calculating conduit or pipe surface area (pSa) in square inches is:

$$pSa = \frac{\pi(OD^2 - ID^2)}{4}$$

The formula for calculating gauge pressure (Gp) when the conduit or cylinder area is 1.00 square inch is:

$$Gp = pSa \times Ip$$

Finally, the formula for calculating machine gauge pressure (MGp), when pipe surface area, interfacial pressure and cylinder area of machine are known, is:

$$MGp = \frac{pSa \times 1p}{Ca}$$

As used hereinabove:
  MGp=Machine gauge pressure psi
  $\pi$=3.1416 Circle formula
  $OD^2$=Outside Diameter in inches×itself
  $ID^2$=Inside Diameter in inches×itself
  Ip=Interfacial pressure ($\approx$140 psi) PVC
  Ca=Cylinder area of machine in sq. inches
  pSa=Pipe surface area in sq. inches
  Gp=Gauge pressure when cylinder area=1.00

Through extensive testing and documentation, the charts in FIGS. 4-9 have been created for quickly establishing various parameters for use in the above formulae when the interfacial pressure is about 140 psi. In these charts, nominal pipe diameter, outside pipe diameter, inside pipe diameter, surface area, gauge pressure and dimension ratio are all set forth. The cylinder area is based on 1.00. Further, in order to calculate the machine gauge pressure and psi using the charts in FIGS. 4-9, the listed gauge pressure and psi should be divided by the cylinder area in square inches of the machine to be used. In order to establish proper gauge pressure using all types and sizes of machines, the noted gauge pressure in the charts and the figures should be divided by the effective cylinder area of the machine in use.

In particular, FIG. 4 is a chart for providing a gauge pressure as detailed above. In particular, FIG. 4 is directed to pipe having a specified cast iron outside diameter (CIOD), which may also be referred to as ductile iron pipe size (DIPS). The CIOD or DIPS is a common sizing convention for pressure in municipal water pipes, as set forth in the appropriate AWWA Standards. With respect to polyvinyl chloride pipe, the outside diameter and dimension ratio (DR) is used to determine wall thickness. Dimension ratio is the quotient derived from the division of the outside diameter by the minimum wall thickness.

FIG. 5 is a chart providing gauge pressure for another common sizing convention of PVC pipe. Specifically, this convention is referred to as a Series or Iron Pipe Size (IPS) pipe. In this convention, the outside diameter is somewhat smaller than the CIOD or the DIPS size for the same nominal diameter. Accordingly, the standard dimension ratio (SDR) is defined as being identical to the dimension ratio in CIOD pipe. Therefore, SDR is used with Series or IPS pipe, whereas DR is used with CIOD or DIPS pipe. FIG. 5 provides the gauge pressure for standard IPS or Series sizes with an SDR of 41.

FIG. 6 also provides gauge pressure as discussed above in connection with FIG. 5. However, in FIG. 6, the nominal three-inch figure has been added, and the SDR is 32.5. FIG. 7 also provides gauge pressure, where the SDR is 26, and FIG. 8 still further provides gauge pressure, where the SDR is 21.

Finally, FIG. 9 is a chart that is similar to FIG. 8, except FIG. 9 introduces a variable dimension ratio for use when piping is sized by Schedule. Industrial use IPS sized pipe wall thickness is typically referred to as Schedule 40 or Schedule 80. This scheduling indicates a certain pressure rating and dimension ratio by size, as listed in FIG. 9.

Pipe drag resulting from pipe weight and roller resistance must be added to the calculated gauge pressure and psi. Further, extreme weather conditions, e.g., wind, rain, heat, cold, snow, etc., must be allowed for and numbers adjusted appropriately. Weather shelters may be required for inclement conditions. Further, it is noted that, unlike polyethylene fusion, PVC fusion must be handled carefully, especially in axial lifting or bending. Spreader bars or "Y" slings should be used to handle the pipe safely. In addition, heating a long length of fused liner conduit 16 using a hot air blower or steam generator may result in the pipe becoming more flexible and safer to handle in cold weather.

In this manner, the present invention provides a method and apparatus for use in a fusion process that is particularly adaptable in fusing polyvinyl chloride conduit. The present method and apparatus allows for the connection of multiple conduit portions or lengths with a joint that equals the strength of the original conduit and does not increase the diameter of the joint area beyond the original conduit diameter. Still further, the present invention presently invented method and apparatus provide a single piece of liner conduit 16 starting stock with no mechanical joints.

This invention has been described with reference to the preferred embodiments. Obvious modifications and alterations will occur to others upon reading and understanding the preceding detailed description. It is intended that the invention be construed as including all such modifications and alterations.

What is claimed is:

1. A method for butt fusing a first conduit portion to a second conduit portion, comprising:
   facing at least one of the first terminal edge of the first conduit and the first terminal edge of the second conduit;
   aligning the first terminal edge of the first conduit portion with the first terminal edge of the second conduit portion;
   heating and melting at least a portion of a first terminal edge of the first conduit portion and at least a portion of a first terminal edge of the second conduit portion, wherein the first conduit portion and the second conduit portion are comprised of a polyvinyl chloride material, wherein the heating and melting includes contact of at least a portion of at least one of the first terminal edge of the first conduit portion and the first terminal edge of the second conduit portion with a heating plate at a temperature of about 415° F.;
   butt fusing the first conduit portion and the second conduit portion together by engaging the heated and melted first terminal edge of the first conduit portion with the heated and melted first terminal edge of the second conduit portion at an engagement interfacial pressure of about 140 psi, thereby creating a butt fused joint area, such that an interior sidewall of the first conduit portion is free of overlap with an interior sidewall of the second conduit portion, an interior sidewall of the first conduit portion is free of overlap with an exterior sidewall of the second conduit portion and an interior sidewall of the second conduit portion is free of overlap with an exterior sidewall of the first conduit portion; and
   optionally removing at least a portion of a resultant external bead extending around the butt fused joint area.

2. The method of claim 1, wherein each of the first conduit portion and the second conduit portion has a pressure rating of about 80 psi to about 370 psi at a water temperature of 73° F. (23° C.).

3. The method of claim 1, wherein each of the first conduit portion and the second conduit portion has a nominal pipe size ranging from about 3 inches to about 36 inches.

4. The method of claim 1, wherein the heating and melting includes contact of at least a portion of at least one of the first terminal edge of the first conduit portion and the first terminal edge of the second conduit portion with a heating plate.

5. The method of claim 1, further comprising removing at least a portion of a resultant external bead extending around the butt fused joint area.

6. The method of claim 1, further comprising: heating and melting at least a portion of a second terminal edge of the first conduit portion and at least a portion of a first terminal edge of a subsequent conduit portion; and
   engaging the second terminal edge of the first conduit portion with the first terminal edge of the subsequent conduit portion, thereby creating a subsequent butt fused joint area.

7. The method of claim 1, wherein the heating comprises simultaneous heating of the first terminal edge of the first conduit portion and the first terminal edge of the second conduit portion.

8. The method of claim 1, wherein the heating and melting comprises applying a plurality of heat zones to at least a portion of at least one of the first terminal edge of the first conduit portion and the first terminal edge of the second conduit portion, the plurality of heat zones configured to provide a heat profile to at least a portion of the at least one of the first terminal edge of the first conduit portion and the first terminal edge of the second conduit portion.

9. The method of claim 8, comprising automatically controlling at least one of the plurality of heat zones.

10. A method for butt fusing a first conduit portion to a second conduit portion, comprising:
    facing at least one of the first terminal edge of the first conduit and the first terminal edge of the second conduit;
    aligning the first terminal edge of the first conduit portion with the first terminal edge of the second conduit portion; heating and melting at least a portion of a first terminal edge of the first conduit portion and at least a portion of a first terminal edge of the second conduit portion, wherein the first conduit portion and the second conduit portion are comprised of a polyvinyl chloride material, wherein the heating and melting includes contact of at least a portion of at least one of the first terminal edge of the first conduit portion and the first terminal edge of the second conduit portion with a heating plate at a temperature of about 415° F.;
    butt fusing the first conduit portion and the second conduit portion together by engaging the heated and melted first terminal edge of the first conduit portion with the heated and melted first terminal edge of the second conduit portion at an engagement interfacial pressure of about 140 psi, thereby creating a butt fused joint area, such that an interior sidewall of the first conduit portion is free of overlap with an interior sidewall of the second conduit portion, an interior sidewall of the first conduit portion is free of overlap with an exterior sidewall of the second conduit portion and an interior sidewall of the second conduit portion is free of overlap with an exterior sidewall of the first conduit portion and wherein the butt fused joint area is free of a coupler between the first conduit portion and the second conduit portion; and
    optionally removing at least a portion of a resultant external bead extending around the butt fused joint area.

11. The method of claim 10, further comprising: heating and melting at least a portion of a second terminal edge of the first conduit portion and at least a portion of a first terminal edge of a subsequent conduit portion; and
    engaging the second terminal edge of the first conduit portion with the first terminal edge of the subsequent conduit portion, thereby creating a subsequent butt fused joint area.

* * * * *